United States Patent [19]

Austin

[11] Patent Number: 5,389,740
[45] Date of Patent: Feb. 14, 1995

[54] SAFETY COVER FOR ELECTRICAL OUTLETS

[76] Inventor: Kathleen A. Austin, 220 Delaware Ave., Milford, N.J. 08848

[21] Appl. No.: 164,967

[22] Filed: Dec. 10, 1993

[51] Int. Cl.6 .............................................. H02G 3/14
[52] U.S. Cl. ...................................... 174/67; 439/147
[58] Field of Search ...................... 174/67; 220/242; 439/133, 135, 136, 147

[56] References Cited

U.S. PATENT DOCUMENTS

| | | | |
|---|---|---|---|
| 2,891,102 | 6/1959 | Grimes | 174/67 |
| 4,063,110 | 12/1977 | Glick | 174/67 X |
| 4,593,541 | 6/1986 | Hollis | 174/67 X |
| 4,988,832 | 1/1991 | Shotey | 174/67 |
| 5,045,640 | 9/1991 | Riceman | 174/67 |
| 5,171,939 | 12/1992 | Shotey | 174/67 |

Primary Examiner—Leo P. Picard
Assistant Examiner—D. A. Tone

[57] ABSTRACT

A new and improved safety cover for electrical outlets for enclosing an electrical wall outlet for minimizing personal injury due to electric shock and alternatively additionally for providing a tamper-proof device to prevent unauthorized connection or interruption of electrical power to an appliance, the safety cover for electrical outlets comprising a box of electrical nonconducting material fixedly connected to a wall having an electrical wall outlet such that the electrical outlet is surrounded by the box while being accessible within the box, the box additionally having a hinged cover thereon whereby the electrical outlet may be fully enclosed when the cover is closed, the box further having a plurality of notches therethrough wherethrough electrical line cords may removedly extend when the box cover is closed, the box also having a latch whereby the cover is snapidly releasedly retained in the closed position whereby the electrical outlet and plugs connected thereto are fully enclosed to prevent electrical shock due to tampering and to preclude unwanted connection or disconnection of critical electrical equipment.

2 Claims, 4 Drawing Sheets

SAFETY COVER FOR ELECTRICAL OUTLETS

BACKGROUND OF THE INVENTION

1. Field of the Invention

The present invention relates to electrical outlets and more particularly pertains to safety covers for electrical outlets which may be adapted for enclosing an electrical wall outlet for minimizing personal injury due to electric shock and alternatively additionally for providing a tamper-proof means to prevent unauthorized connection or interruption of electrical power to an appliance.

2. Description of the Prior Art

The use of safety covers for electrical outlets is known in the prior art. More specifically, safety cover for electrical outlets heretofore devised and utilized for the purpose of enclosing an electrical wall outlet are known to consist basically of familiar, expected and obvious structural configurations, notwithstanding the myriad of designs encompassed by the crowded prior art which have been developed for the fulfillment of countless objectives and requirements.

The present invention is directed to improving devices for enclosing an electrical wall outlets for minimizing personal injury due to electric shock and alternatively additionally for providing a tamper-proof means to prevent unauthorized connection or interruption of electrical power to an appliance in a manner which is safe, secure, economical and aesthetically pleasing.

For example, U.S. Pat. 5,087,796 to Norman discloses an electrical outlet safety cover that encloses electrical sockets and keeps small children from pulling plugs out of sockets or inserting objects into sockets. The outlet safety cover includes a housing and flexible clip which interlocks with housing to securely hold housing against electrical outlet faceplate. The housing can be installed and removed quickly without the use of a tool, by means of a flexible clip that is attached to existing electrical outlet assembly with a screw. The housing is installed by simply pushing the housing onto flexible clip. To remove housing, adults need to simply apply finger pressure to tabs until housing disengages with flexible clip.

U.S. Patent Des. No. 310,320 to Domian shows a protective cover for electrical outlet consisting of a cover removably hingedly connected to an electrical outlet cover plate, the cover having a snap latch to keep it in the closed position.

Both of the inventions described above may be easily opened without special tools or skills therefore, while they may be useful in preventing electrical shock injury to very small children, lack usefulness in preventing tampering with appliance cords by, or in electrical shock protection of, older children and adults.

U.S. Pat. No. 5,017,148 to Buckshaw describes a safety cap for electrical outlet being secured to the faceplate screw and comprising a pair of safety plugs and a tether connecting the two safety plugs together; each plug has a plug face plate and a pair of prongs integrally attached to the plug face plate for inserting into the electrical outlet.

U.S. Pat. Des. No. 331,386 to Koessler illustrates an electrical outlet safety cover consisting of an outlet faceplate having a pair of hingedly connected generally planar doors which pivot toward each other to close against the faceplate.

Neither of the disclosures show a way to secure or protect an electrical appliance plug inserted into the outlet.

The prior art also discloses a safety cover for an electrical wall outlet as shown in U.S. Pat. No. 4,981,439 to Piedmont which consists of a base plate with at least one cowl means attached to the base plate to enclose an electrical plug when the plug is in the electrical receptacle to reduce possible accidental contact with the prongs of the plug when it is being inserted or extracted while the prongs of the plug are still in contact with the receptacle which reduces the chance of an electrical shock or a fire hazard; there is a protective cap means to place over the access port to the cowl to reduce the chance of undesired entry to the receptacle while the plug is not in place in the receptacle. The invention disclosed does not provide a way to prevent unauthorized removal of the electrical plug nor does it provide a positive locking means to prevent unwanted insertion of an object into the electrical outlet.

In this respect, the safety cover for electrical outlets according to the present invention substantially departs from the conventional concepts and designs of the prior art, and in so doing provides an apparatus primarily developed for the purpose of enclosing an electrical wall outlet for minimizing personal injury due to electric shock and alternatively additionally for providing a tamper-proof means to prevent unauthorized connection or interruption of electrical power to an appliance.

Therefore, it can be appreciated that there exists a continuing need for new and improved safety covers for electrical outlets which can be used for enclosing an electrical wall outlet for minimizing personal injury due to electric shock and alternatively additionally for providing a tamper-proof means to prevent unauthorized connection or interruption of electrical power to an appliance. In this regard, the present invention substantially fulfills this need.

As illustrated by the background art, efforts are continuously being made in an attempt to develop devices for enclosing an electrical wall outlet. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of safety covers for electrical outlets now present in the prior art, the present invention provides an improved safety cover for electrical outlet construction wherein the same can be utilized for enclosing an electrical wall outlet for minimizing personal injury due to electric shock and alternatively additionally for providing a tamper-proof means to prevent unauthorized connection or interruption of electrical power to an appliance. As such, the general purpose of the present invention, which will be described subsequently in greater detail, is to provide a new and improved safety cover for electrical outlet apparatus and method which has all the advantages of the prior art safety cover for electrical outlets and none of the disadvantages.

The invention is defined by the appended claims with the specific embodiment shown in the attached drawings. For the purpose of summarizing the invention, the invention may be incorporated into a new and improved safety cover for electrical outlets for enclosing an electrical wall outlet for minimizing personal injury due to electric shock and alternatively additionally for providing a tamper-proof means to prevent unauthorized connection or interruption of electrical power to an appliance. The safety cover for electrical outlets comprises a box made of rigid electrical-nonconducting material such as phenolic resin having an integral top, bottom, and sides. The box has an open back and front, and also has an integral gusseted mounting hole within each rear corner. The box has a height and width greater than the height and width of a conventional electrical wall outlet cover plate, and a depth substantially greater than the length of a conventional electrical appliance plug. The box additionally has a plurality of notches on the front edge of each side wherethrough electrical line cords may be passed. The box further has catch means along the front edge of the bottom. The safety cover for electrical outlets additionally has a cover made of the same material as the box, the cover having a height and width essentially the same as the box. The cover has an integral latch element sized and located such as to be cooperative with the catch means of the box. The safety cover also has hinge means whereby the cover is hingedly connected to the box along the top edge of both the box and the cover such that, when the cover is pivoted downwardly on the hinge means, the cover latch element is snapidly releasedly received by the box catch means whereby retaining the cover in a closed position. The safety cover for electrical outlets further has a wall having a plurality of holes therein surrounding an electrical outlet to be protected, the holes having a pattern essentially the same as the pattern of the gusseted holes of the box. The safety cover moreover has a plurality of threaded screws extending through the gusseted holes of the box and threadedly engaged with the holes in the wall such that the safety cover is fixedly connected to the wall in surrounding relationship to the electrical outlet whereby the electrical outlet is fully enclosed by the covered box precluding tampering with the electrical outlet or an electrical plug that may be connected thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved safety cover for electrical outlets for enclosing an electrical wall outlet for minimizing personal injury due to electric shock and alternatively additionally for providing a tamper-proof means to prevent unauthorized connection or interruption of electrical power to an appliance, the safety cover for electrical outlets comprising a box of electrical-nonconducting material fixedly connected to a wall having an electrical wall outlet such that the electrical outlet is surrounded by the box while being accessible within the box, the box additionally having a hinged cover thereon whereby the electrical outlet may be fully enclosed when the cover is closed, the box further having a plurality of notches therethrough wherethrough electrical line cords may removedly extend when the box cover is closed, the box also having a latch whereby the cover is snapidly releasedly retained in the closed position whereby the electrical outlet and plugs connected thereto are fully enclosed to prevent electrical shock due to tampering and to preclude unwanted connection or disconnection of critical electrical equipment.

It is another object of the present invention to provide a new and improved safety cover for electrical outlets which may be easily and efficiently manufactured and marketed.

It is a further object of the present invention to provide a new and improved safety cover for electrical outlets which is of a durable and reliable construction.

An even further object of the present invention is to provide a new and improved safety cover for electrical outlets which is susceptible of a low cost of manufacture with regard to both materials and labor, and which accordingly is then susceptible of low prices of sale to the consuming public, thereby making such safety covers for electrical outlets economically available to the buying public.

Still yet another object of the present invention is to provide a new and improved safety cover for electrical outlets which provides in the apparatuses and methods of the prior art some of the advantages thereof, while simultaneously overcoming some of the disadvantages normally associated therewith.

Still yet another object of the present invention is to provide a new and improved safety cover for electrical outlets which provides positive security for preventing unauthorized removal of an electrical appliance plug and also prevents injury from electrical shock by preventing the insertion of objects into the electrical outlet.

Yet another object of the present invention is to provide a new and improved safety cover for electrical outlets which will protect the supply of electrical energy to a critical appliance by preventing unwanted extraction of the appliance plug and will also prevent possible injury to persons working around an electrically powered machine or appliance by preventing unauthorized or inadvertent connection of the equipment to an electrical outlet.

Even still another object of the present invention is to provide a new and improved safety cover for electrical outlets which also offers a means for coiling and storing electrical appliance cords whereby presenting a neat appearance and precluding possible injurious falls to persons tripping over loose electrical cords.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
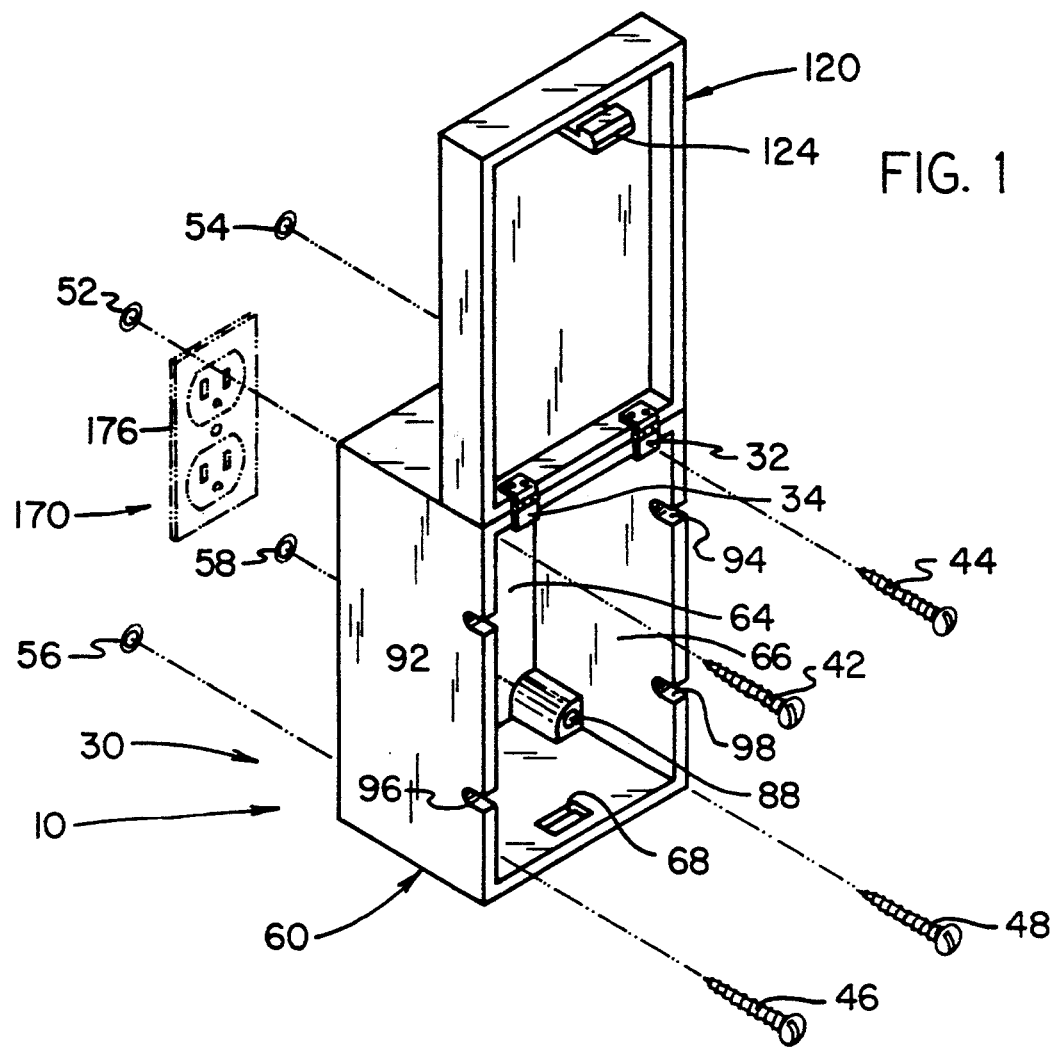
FIG. 1 is a perspective view of the present invention showing its manner of installation.
Figure 2:
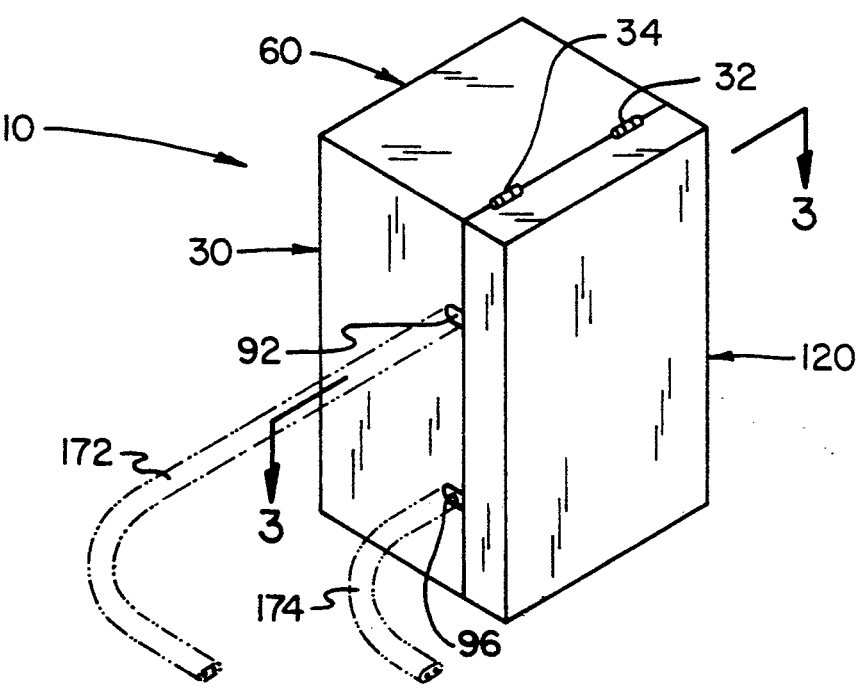
FIG. 2 is a perspective view of the invention of FIG. 1 showing its manner of use.
Figure 3:
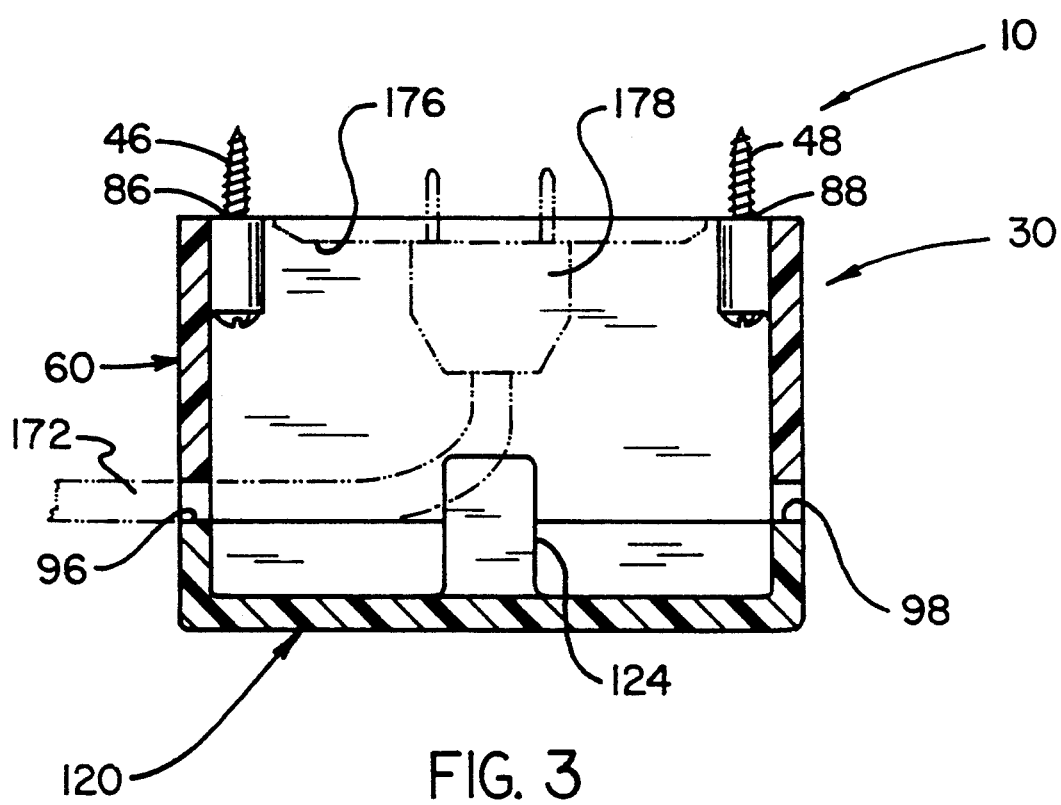
FIG. 3 is a sectional view of the invention of FIG. 2 taken along the line 3—3.
Figure 4:
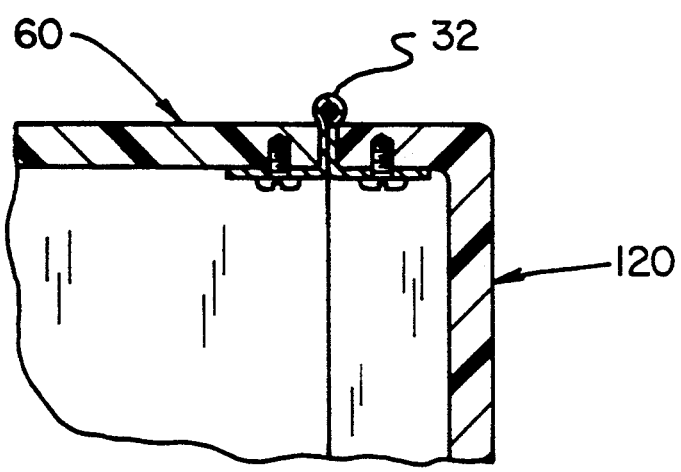
FIG. 4 is a detail sectional of the invention of FIG. 2 showing the manner of hinge construction.
Figure 5:
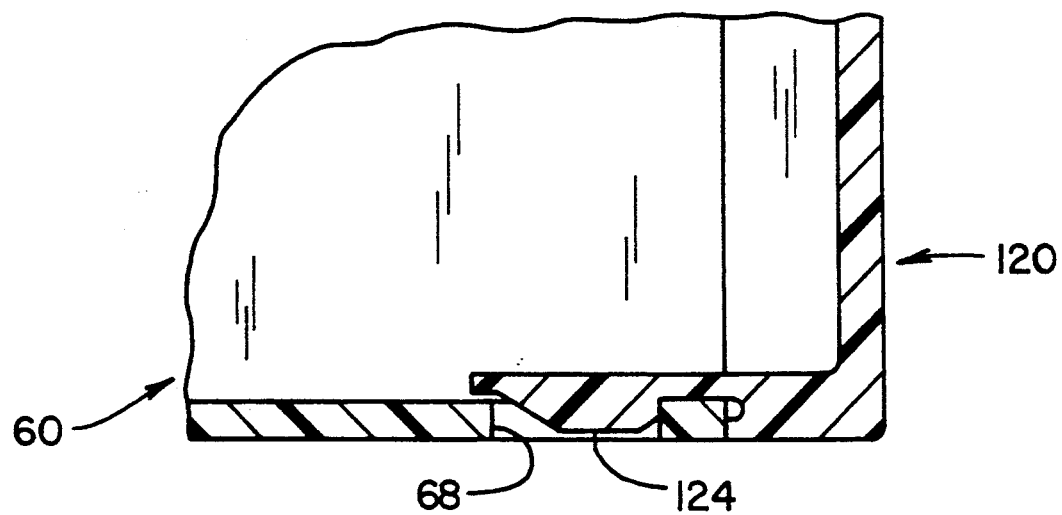
FIG. 5 is a detail sectional view of the invention of FIG. 2 showing the manner of latch construction.
Figure 6:
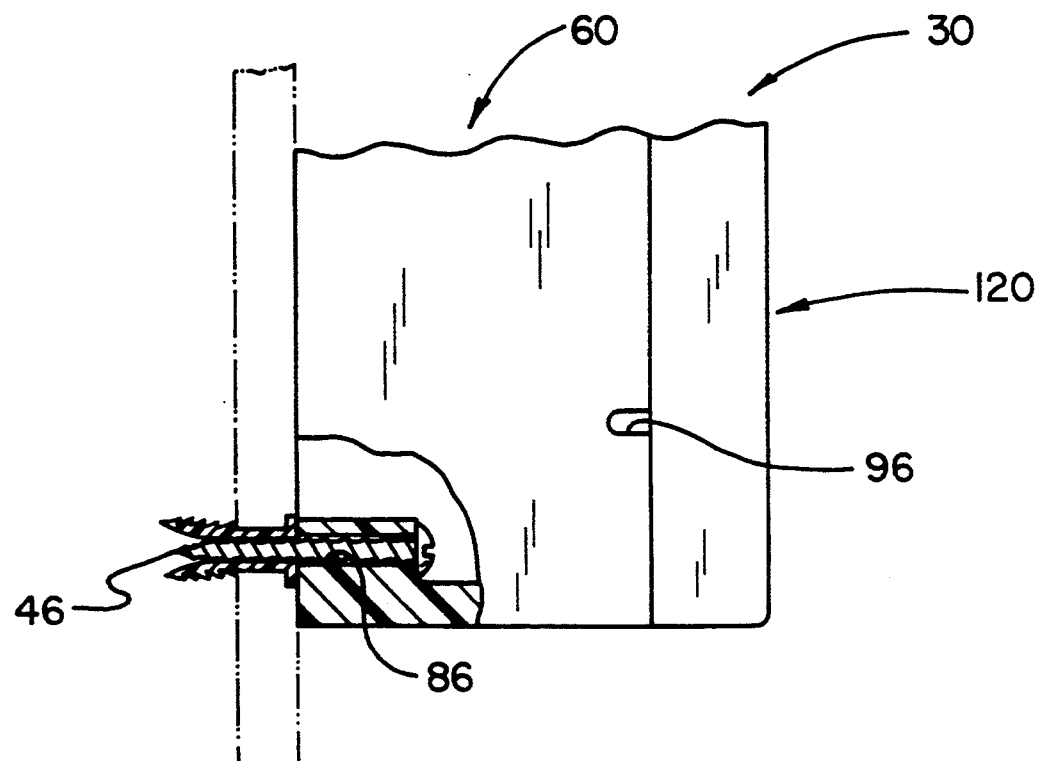
FIG. 6 is a detail view of the invention of FIG. 2 showing the manner of mounting to a hollow drywall.

With reference now to the drawings, and in particular to FIG. 1 thereof, a new and improved safety cover for electrical outlets embodying the principles and concepts of the present invention and generally designated by the reference numeral 10 will be described.

From an overview standpoint, the safety cover for electrical outlets is adapted for use for enclosing an electrical wall outlet for minimizing personal injury due to electric shock and alternatively additionally for providing a tamper-proof means to prevent unauthorized connection or interruption of electrical power to an appliance. See FIG. 1.

With reference now to FIGS. 1 through 6, more specifically, it will be noted that a safety cover for electrical outlets 10 for enclosing an electrical wall outlet 170 for minimizing personal injury due to electric shock and alternatively additionally for providing a tamper-proof means to prevent unauthorized connection or interruption of electrical power to an appliance is shown. The safety cover for electrical outlets 10 comprises a box 60 made of rigid electrical-nonconducting material such as phenolic resin having an integral top, bottom, and sides.

The box 60 has an open back 64 and front 66, and also has an integral gusseted mounting hole 82, 84, 86, and 88 within each rear corner. The box 60 has a height and width greater than the height and width of a conventional electrical wall outlet cover plate 176, and a depth substantially greater than the length of a conventional electrical appliance plug 178. The box 60 additionally has a plurality of notches 92, 94, 96, and 98 on the front edge of each side wherethrough electrical line cords 172 and 174 may be passed. The box 60 further has catch means 68 along the front edge of the bottom. The safety cover for electrical outlets 10 additionally has a cover 120 made of the same material as the box 60, the cover 120 having a height and width essentially the same as the box 60.

The cover 120 has an integral latch element 124 sized and located such as to be cooperative with the catch means 68 of the box 60. The safety cover 10 also has hinge means 32 whereby the cover 120 is hingedly connected to the box 60 along the top edge of both the box and the cover such that, when the cover 120 is pivoted downwardly on the hinge means 32, the cover latch element 124 is snapidly releasedly received by the box catch means 68 whereby retaining the cover in a closed position. The safety cover for electrical outlets 10 further has a plurality of holes 52, 54, 56, and 58 within a wall surrounding an electrical outlet 170 to be protected, the holes 52, 54, 56, and 58 having a pattern essentially the same as the pattern of the gusseted holes 82, 84, 86, and 88 of the box.

The safety cover, moreover, has a plurality of threaded screws 42, 44, 46, and 48 extending through the gusseted holes 82, 84, 86, and 88 of the box and threadedly engaged with the holes 52, 54, 56, and 58 in the wall such that the safety cover 10 is fixedly connected to the wall in surrounding relationship to the electrical outlet 170 whereby the electrical outlet is fully enclosed by the covered box precluding tampering with the electrical outlet or an electrical plug that may be connected thereto.

Figure 7:
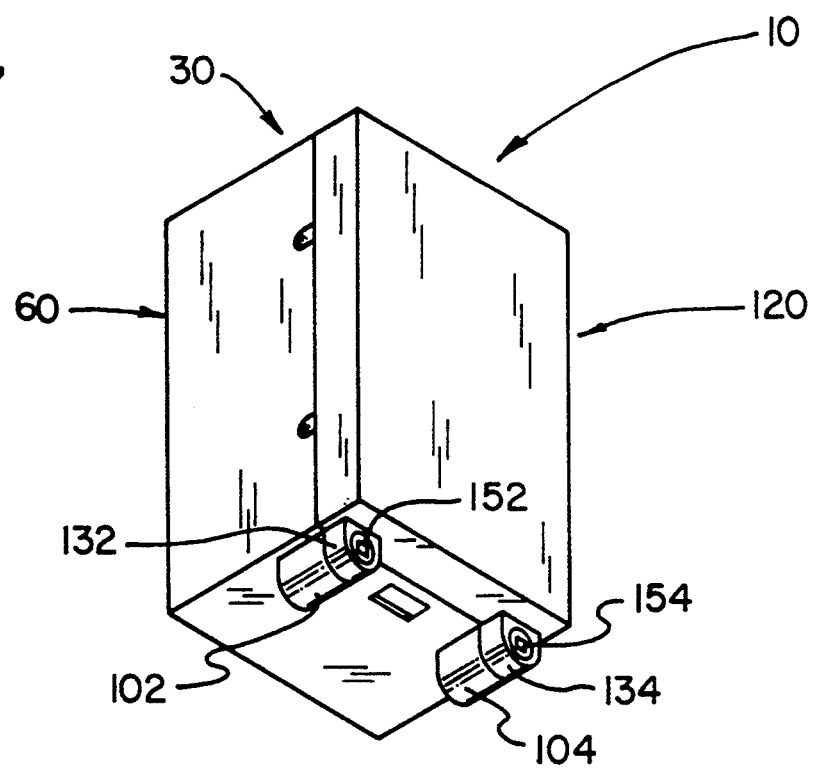
FIG. 7 is a perspective view of the invention of FIG. 2 showing a modification thereof which adds locking means to the cover.
Figure 8:
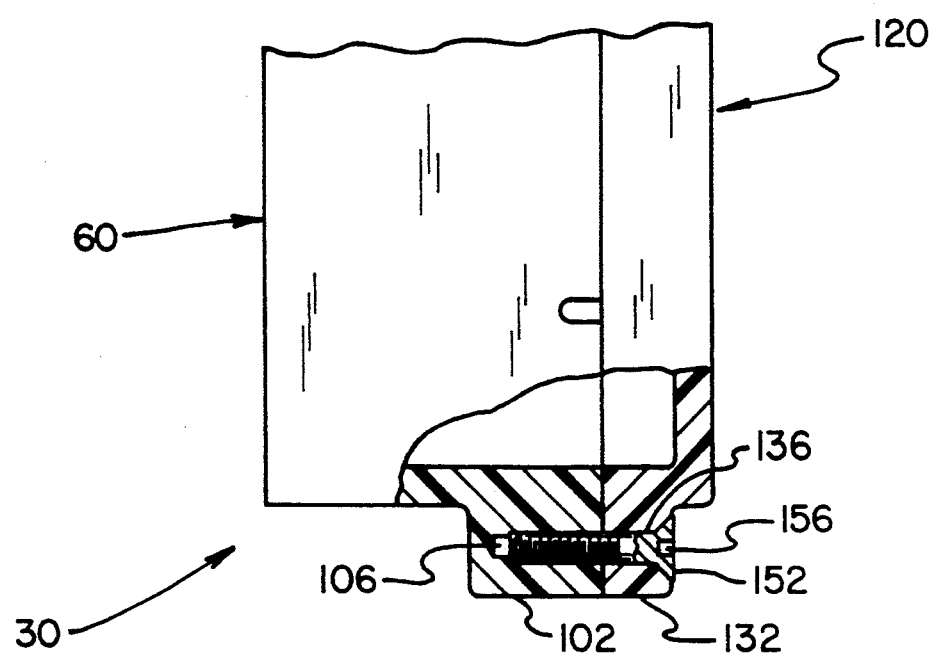
FIG. 8 is a detail view of the invention of FIG. 7 showing the manner of construction of the locking means.

In a modification to the preferred embodiment of the present invention, shown in FIGS. 7 and 8, the safety cover for electrical outlets 10 further includes locking means whereby unwanted opening of the cover is prevented. The locking means comprises a first identical pair of integral formed lateral ears 102 and 104 projecting downwardly from the exterior bottom surface of the box 60, the ears 102 and 104 having threaded longitudinal holes 106 and 108 therethrough.

The locking means also includes a second pair of integral formed lateral ears 132 and 134 projecting downwardly from the exterior bottom surface of the cover 120 such that the second pair of ears 132 and 134 is in facing touching relationship with the first pair of ears 102 and 104 when the cover 120 is closed onto the box 60. The second pair of ears 132 and 134 also having a longitudinal hole 136 and 138 therethrough, the holes 136 and 138 being coaxial with the threaded holes 106 and 108 of the first pair of ears 102 and 104 when the cover 120 is closed onto the box 60.

The locking means further includes an identical pair of threaded screws 152 and 154 extending through the holes 136 and 138 in the second pair of ears and threadedly engaging with the threaded holes 106 and 108 of the first pair of ears whereby the cover 120 is secured in the closed position onto the box 60. The threaded screws 152 and 154 also have a special drive socket 156 and 158, such as a square drive, requiring the use of a special tool (not shown) to operate the screws 152 and 154 whereby unauthorized opening of the safety cover for electrical outlets 10 is prevented.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A safety cover for electrical outlets for enclosing an electrical wall outlet for minimizing personal injury due to electric shock and alternatively additionally for providing a tamper-proof means to prevent unauthorized connection or interruption of electrical power to an appliance, the safety cover for electrical outlets comprising:

a box made of rigid electrical-nonconducting material and having an integral top, bottom, and sides, the box having an open back and front, the box also having an integral gusseted mounting hole within each rear corner, the box having a height and width greater than the height and width of an electrical wall outlet cover plate, the box having a depth substantially greater than the length of an electrical appliance plug, the box additionally having a plurality of notches on the front edge of each side wherethrough electrical line cords may be passed, the box further having catch means along the front edge of the bottom;

a cover made of the same material as the box, the cover having a height and width essentially the same as the box, the cover having an integral latch element sized and located such as to be cooperative with the catch means of the box;

hinge means whereby the cover is hingedly connected to the box along the top edge of both the box and the cover such that when the cover is pivoted downwardly on the hinge means the cover latch element is snapidly releasedly received by the box catch means whereby retaining the cover in a closed position; and, a plurality of threaded screws extending through the gusseted holes of the box and threadedly engagable to a plurality of holes within a wall surrounding an electrical outlet to be protected, the holes having a pattern essentially the same as the pattern of the gusseted holes of the box such that the safety cover is fixedly securable to the wall in surrounding relationship to the electrical outlet whereby the electrical outlet is fully enclosable by the covered box, thereby precluding tampering with the electrical outlet or an electrical plug that may be connected thereto.

2. The safety cover for electrical outlets of claim 1 and further including locking means whereby unwanted opening of the cover is prevented.

* * * * *